United States Patent
Sun et al.

(10) Patent No.: US 10,579,798 B2
(45) Date of Patent: Mar. 3, 2020

(54) ELECTRONIC DEVICE AND METHOD FOR DETECTING MALICIOUS FILE

(71) Applicant: ACER CYBER SECURITY INCORPORATED, Taipei (TW)

(72) Inventors: Ming-Kung Sun, New Taipei (TW); Chiung-Ying Huang, New Taipei (TW); Tung-Lin Tsai, New Taipei (TW); Gu-Hsin Lai, New Taipei (TW); Chia-Mei Chen, New Taipei (TW); Tzu-Ching Chang, New Taipei (TW)

(73) Assignee: ACER CYBER SECURITY INCORPORATED, Taipei (TW)

( * ) Notice: Subject to any disclaimer, the term of this patent is extended or adjusted under 35 U.S.C. 154(b) by 263 days.

(21) Appl. No.: 15/677,223

(22) Filed: Aug. 15, 2017

(65) Prior Publication Data
US 2018/0165452 A1    Jun. 14, 2018

(30) Foreign Application Priority Data
Dec. 13, 2016    (TW) .............. 105141250 A

(51) Int. Cl.
*G06F 21/00* (2013.01)
*G06F 21/56* (2013.01)

(52) U.S. Cl.
CPC ............ *G06F 21/566* (2013.01); *G06F 21/56* (2013.01)

(58) Field of Classification Search
CPC ...... G06F 21/56; G06F 21/566; G06F 21/577; G06F 21/562
See application file for complete search history.

(56) References Cited

U.S. PATENT DOCUMENTS

| 7,260,847 | B2 | 8/2007 | Sobel et al. |
| 7,353,507 | B2 | 4/2008 | Gazdik et al. |
| 7,380,277 | B2 | 5/2008 | Szor |

(Continued)

FOREIGN PATENT DOCUMENTS

| TW | 200508849 | 3/2005 |
| TW | 200525346 | 8/2005 |

(Continued)

OTHER PUBLICATIONS

AAron Walters, "FATKit: Detecting Malicious Library Injection and Upping the 'Anti'", Jul. 2006, 4TPhi Forensic Research, pp. 1-12 (Year: 2006).*

(Continued)

*Primary Examiner* — Joseph P Hirl
*Assistant Examiner* — Chi D Nguy
(74) *Attorney, Agent, or Firm* — McClure, Qualey & Rodack, LLP

(57) ABSTRACT

An electronic device and a method for detecting a malicious file are provided. The method includes the following steps: An executable file is searched, and an import table is extracted from the executable file. The import table includes at least a name of a first DDL and a name of a second DDL. A distance between the first DLL and the second DLL is calculated. Whether the distance exceeds a threshold is determined. If the distance exceeds the threshold, then whether a duplicate content of the import table exists in the executable file is checked. The executable file is regarded as a malicious file if the duplicate content of the import table exists in the executable file.

17 Claims, 4 Drawing Sheets

(56) References Cited

U.S. PATENT DOCUMENTS

| | | |
|---|---|---|
| 7,424,706 B2 | 9/2008 | Ivanov et al. |
| 7,519,998 B2 | 4/2009 | Cai et al. |
| 7,721,334 B2 | 5/2010 | Costea et al. |
| 2013/0179975 A1 | 7/2013 | Chiu et al. |
| 2016/0283714 A1* | 9/2016 | LeMay .................. G06F 21/56 |
| 2017/0070523 A1* | 3/2017 | Bailey ................ H04L 63/1416 |

FOREIGN PATENT DOCUMENTS

| | | |
|---|---|---|
| TW | I354887 | 12/2011 |
| TW | 201329766 | 7/2013 |

OTHER PUBLICATIONS

Y-Y Xu, A. H. Sung, P. Chavez, S. Mukkamala, "Polymorphic Malicious Executable Scanner by API Sequence Analysis", Department of Computer Science, New Mexico Tech, IEEE, Proceedings of the Fourth International Conference on Hybrid Intelligent Systems (HIS'04) (Year: 2004).*

Katja Hahn, "Robust Static Analysis of Portable Executable Malware", Master Thesis in Computer Science, Dec. 2014, HTWK Leipzig (Year: 2014).*

TIPO Office Action dated Jun. 30, 2017 in corresponding Taiwan application (No. 105141250).

\* cited by examiner

ELECTRONIC DEVICE AND METHOD FOR DETECTING MALICIOUS FILE

This application claims the benefit of Taiwan application Serial No. 105141250, filed Dec. 13, 2016, the subject matter of which is incorporated herein by reference.

BACKGROUND OF THE INVENTION

Field of the Invention

The invention relates in general to an electronic device and a detection method, and more particularly to an electronic device and a method for detecting a malicious file.

Description of the Related Art

Along with the popularity of network technology, many information need to be transmitted through network. An electronic device, once connected to the network, may easily become a target of malicious programs. Existing anti-virus technology detects and scans files to locate malicious programs or files according to the known characteristic values of the malicious programs. For example, ordinary anti-virus software detects and scans malicious files according to the known characteristic values of the malicious programs. However, such method cannot prevent the electronic device from the PE infection caused by advanced persistent threat (APT) or zero-day malicious programs because anti-virus software companies do not have the characteristic values of the newly launched or customized malicious programs, and therefore cannot locate the malicious programs or files in the electronic device. Therefore, how to effectively detect malicious programs or files in the electronic device has become a prominent task for the industry.

SUMMARY OF THE INVENTION

The present invention is directed to an electronic device and a method for detecting a malicious file. The method for detecting a malicious file quickly identifies a possible malicious file, and accurately determines whether the possible malicious file is a malicious file.

According to one embodiment of the present invention, a method for detecting a malicious file is provided. The method includes the following steps. An executable file is searched, and an import table is extracted from the executable file. The import table at least includes a name of a first dynamic-link library (DLL) and a name of a second DDL. A distance between the first DLL and the second DLL is calculated. Whether the distance exceeds a threshold is determined. If the distance exceeds the threshold, whether a duplicate content of the import table exists in the executable file is checked. The executable file is regarded as a malicious file if the duplicate content of the import table exists in the executable file.

According to another embodiment of the present invention, an electronic device is provided. The electronic device includes a processor and a storage unit. The storage unit stores an executable file. The processor searches the executable file and extracts an import table from the executable file. The import table at least includes a name of a first DDL and a name of a second DDL. The processor calculates a distance between the first DLL and the second DLL. The processor determines whether the distance exceeds a threshold. If the distance exceeds the threshold, then the processor checks whether a duplicate content of the import table exists in the executable file. The executable file is regarded as a malicious file if the duplicate content of the import table exists in the executable file.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 5 is a schematic diagram of an example of an import table.

DETAILED DESCRIPTION OF THE INVENTION

Figure 1:
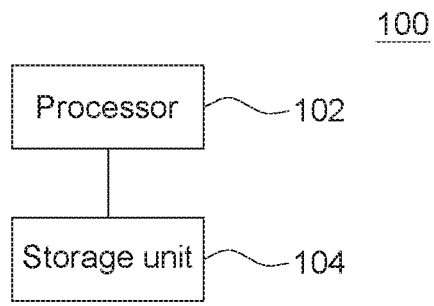
FIG. 1 is a block diagram of an electronic device.

FIG. 1 is a block diagram of an electronic device 100. The electronic device 100 includes a processor 102 and a storage unit 104. The electronic device 100 can be realized by a desktop computer, a laptop computer, or a PC tablet. The storage unit 104 can be realized by a hard disk, a memory card, or a memory for storing data files.

Figure 2:
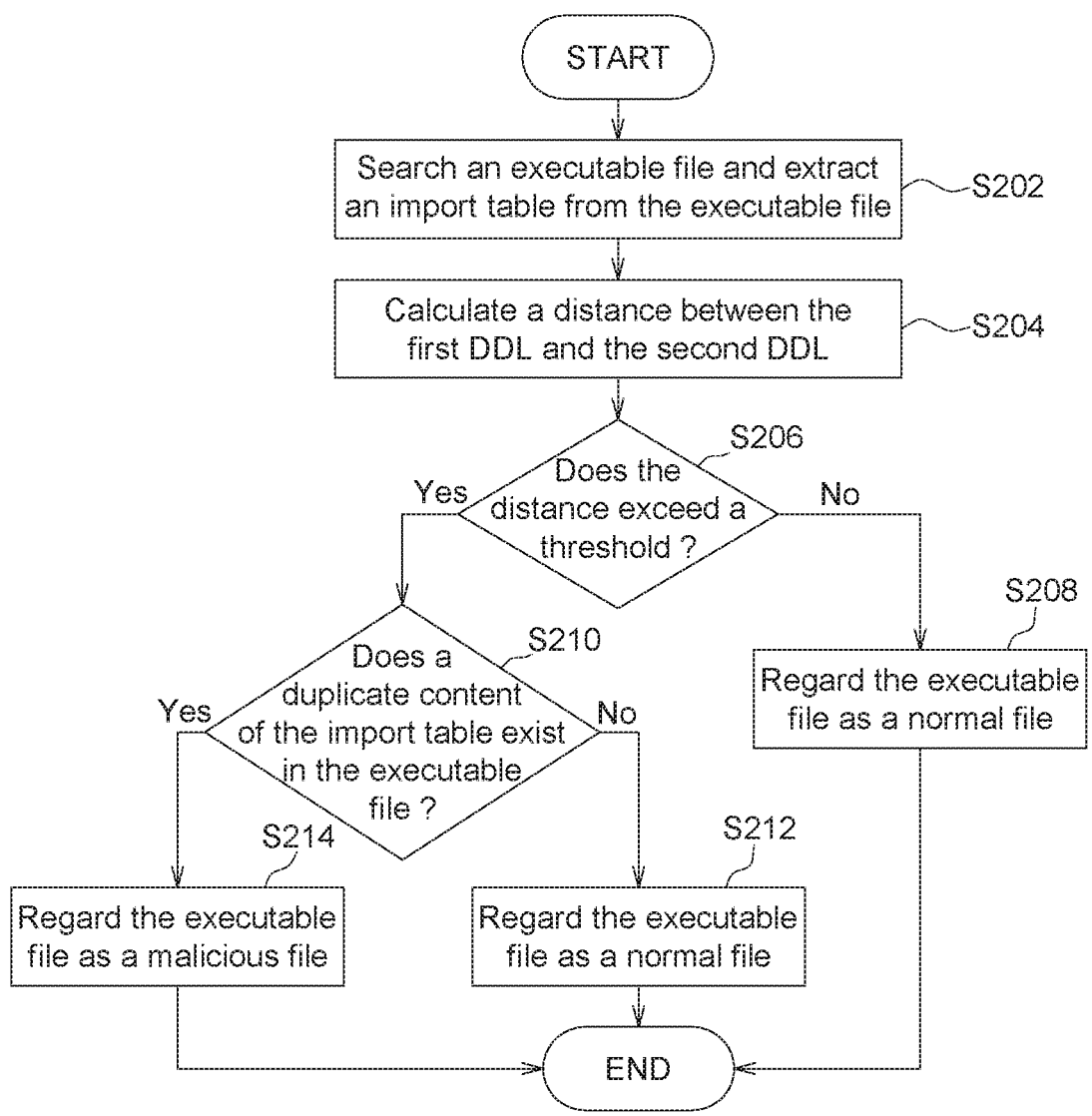
FIG. 2 is a flowchart of a method for detecting a malicious file according to an embodiment of the invention.
Figure 3:
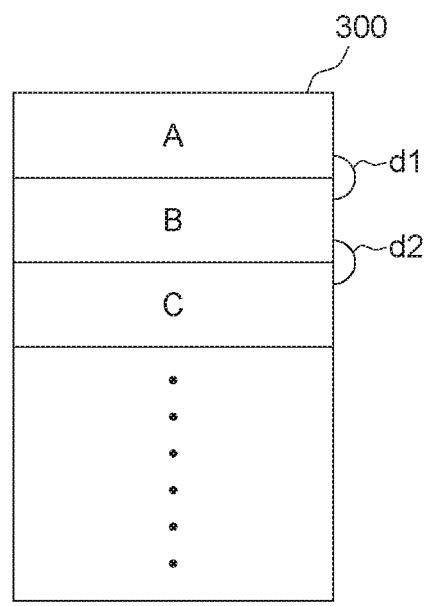
FIG. 3 is a schematic diagram of an example of an import table.

Refer to FIGS. 1 and 2. FIG. 2 is a flowchart of a method for detecting a malicious file according to an embodiment of the invention. Firstly, the method begins at step S202, an executable file is searched and an import table is extracted from the executable file by the processor 102. Specifically, the executable file is stored in the storage unit 104, and the processor 102 searches the executable file stored in the storage unit 104 and extracts the import table from the executable file. The import table is read-only and records the DDLs imported by the executable file. Referring to FIG. 3, a schematic diagram of an example of an import table 300 is shown. The import table 300 includes a name A of a first DDL, a name B of a second DDL, and a name C of a third DDL.

Then, the method proceeds to step S204, a distance between the DDLs is calculated by the processor 102. For example, the processor 102 calculates a distance d1 between the first DDL and the second DDL and a distance d2 between the second DDL and the third DDL.

Figure 4:
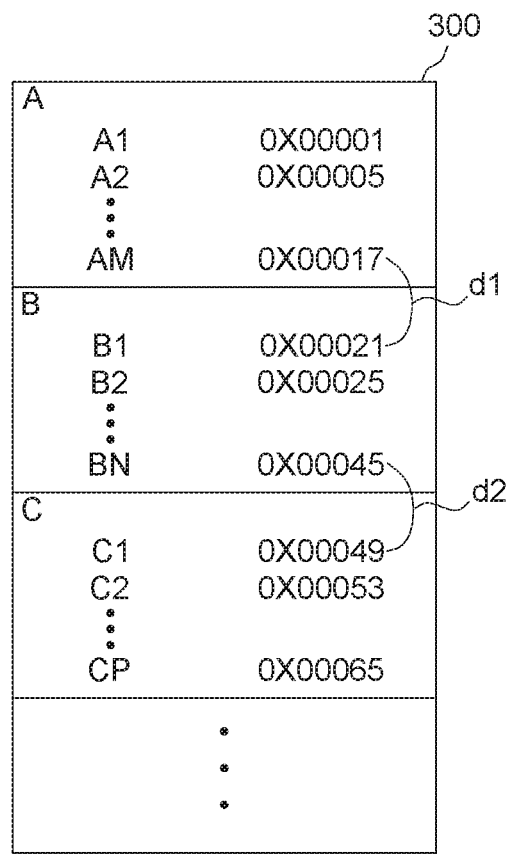
FIG. 4 is a schematic diagram of another example of an import table.

Then, the method proceeds to step S206, whether the distance exceeds a threshold is determined by the processor 102. If the distance does not exceed the threshold, then the method proceeds to step S208. If the distance exceeds the threshold, then the method proceeds to step S210. The threshold can be a self-defined value. In one embodiment, the threshold relates to an average value and a standard deviation of the distances among multiple normal DDLs. For example, the threshold can be defined as the average value of the distances among multiple normal DDLs plus two times of the standard deviation. However, the definition of the threshold of the invention is not limited thereto. Refer to FIGS. 3 and 4. FIG. 4 is a schematic diagram of another example of an import table 300. Each DDL may include multiple functions. The import table 300 further includes the names of the functions of the DDL and the addresses of the functions. For example, the import table 300 includes a name A of a first DDL, the names A1, A2, . . . , AM of the functions of the first DDL and the address of each function (such as "0x00001, 0x00005, . . . , 0x00017"); a name B of a second DDL, the names B1, B2, . . . , BN of the functions of the second DDL and the address of each function (such as "0x00021, 0x00025, . . . , 0x00045"); a name C of a third DDL, the names C1, C2, . . . , CP of the functions of the third DDL and the address of each function (such as "0x00049, 0x00053, . . . , 0x00065"). The function with name A1 is the first function of the first DDL, and the function with name AM is the last function of the first DDL. The function with name B1 is the first function of the second DDL, and the function with name BN is the last function of the second DDL. The function with name C1 is the first function of the third DDL, and the function with name CP is the last function of the third DDL.

A distance d1 between the first DDL and the second DDL as indicated in FIG. 3 is obtained according to the difference obtained by subtracting the address of the last function of the first DDL from the address of the first function of the second DDL. A distance d2 between the second DDL and the third DDL is obtained according to the difference obtained by subtracting the address of the last function of the second DDL from the address of the first function of the third DDL. That is, the distance d1 is expressed as: 0x00021−0x00017=4 bytes; the distance d2 is expressed as: 0x00049−0x00045=4 bytes. The address of the function is a relative virtual address (RVA).

During ordinary program compilation, the addresses of the functions of the DDL imported by the program will be defined and recorded in the import table, and the deviation of the distances between the addresses of the functions normally will not be too large. For example, the distances between the functions mostly are about 4 to 300 bytes. If the executable file generated from the compilation is found to have been attacked by a hacker, the distances between the addresses newly added by the hacker (here below referred as malicious address) and the addresses of normal functions would normally be greater than tens of thousands of bytes. Again, refer to FIGS. 3 and 4. The distance d1 and the distance d2 calculated by the processor 102 both are 4 bytes. The processor 102 determines that both the distance d1 and the distance d2 do not exceed the threshold (suppose the threshold is defined as 300 bytes), and this implies that no malicious address has been added to the import table 300 by the hacker, and the method proceeds to step S208. In step S208, the executable file is regarded as a normal file by the processor 102.

Figure 5:
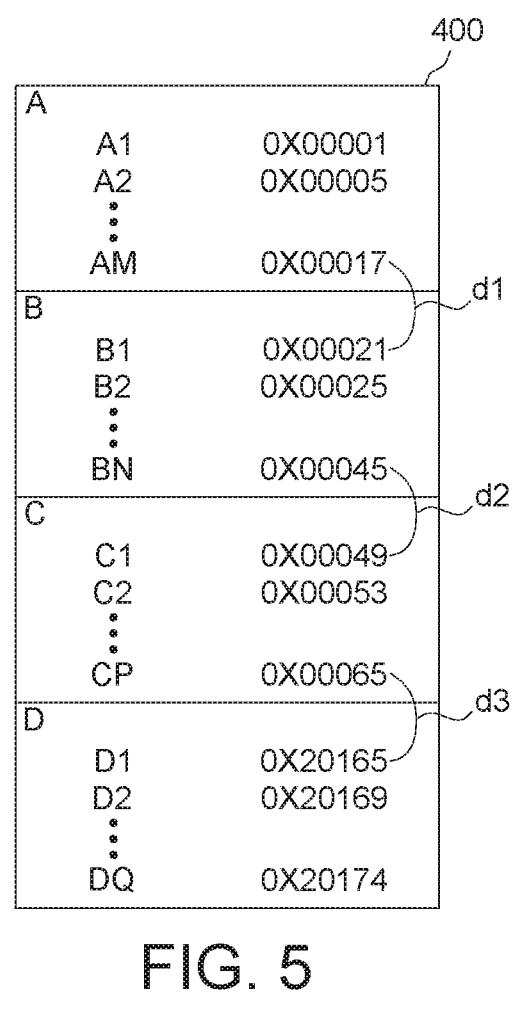

Referring to FIG. 5, a schematic diagram of an example of an import table 400 is shown. The processor 102 calculates the distance d1 as 4, the distance d2 as 4, and the distance d3 as 20100. The processor 102 then determines that the distance d3 exceeds the threshold (suppose the threshold is defined as 300 bytes), and this implies that a malicious address might have been added to the import table 400 by the hacker, and the executable file could possibly be a malicious file. Then, the method proceeds to the step S210, whether the executable file is a malicious file is further determined.

In step S206, which executable files could possibly be malicious files can be quickly identified according to the distance and the threshold. In an embodiment, the threshold is set as the average value of the distances among multiple normal DDLs plus two times of the standard deviation, and the accuracy of identifying malicious files could reach 95% to 97.5% (the adjustment of the threshold will affect the accuracy). The average value and the standard deviation of the distances among multiple normal DDLs can be calculated using a newly installed system. The newly installed system assumes that all files within the system are normal files, searches all executable files across the newly installed system(s), calculates the distances among multiple normal DDLs in each executable file, and uses the average value and the standard deviation obtained from the calculation of distances as a reference for setting the threshold of the invention. In another embodiment, if the threshold is set as two times of the standard deviation of the distances among multiple normal DDLs, then the accuracy of identifying malicious files can reach 97.5%. Therefore, in step S206, possible malicious files can be quickly identified according to whether the distance exceeds the threshold. Then, in step S210, whether the identified file is a malicious file is accurately determined.

Figure 6A:
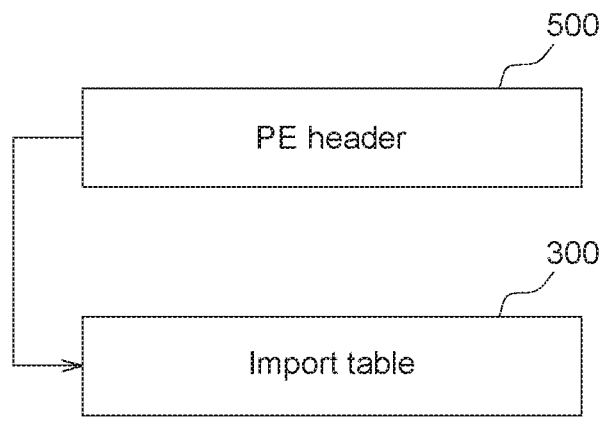
FIG. 6A is a schematic diagram of an import table and a PE header in a normal executable file.
Figure 6B:
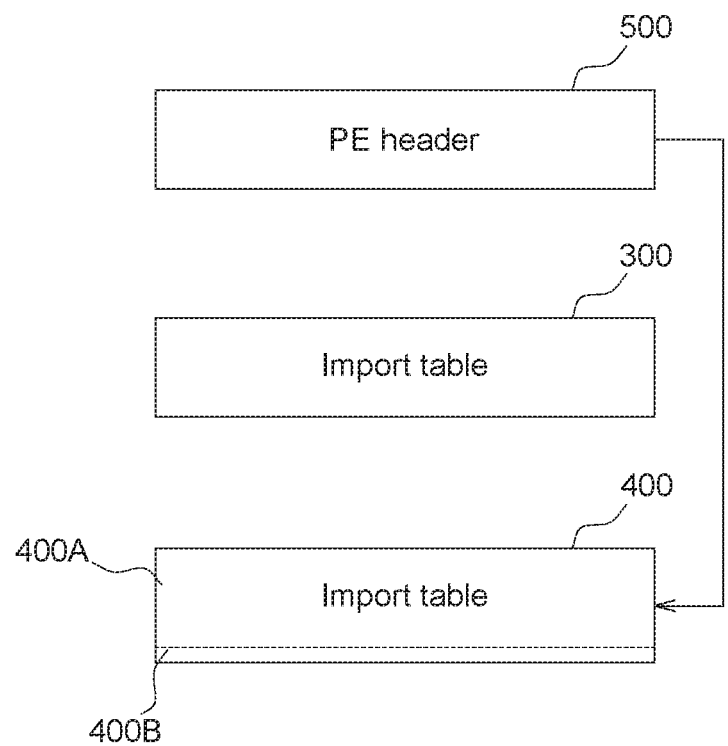
FIG. 6B is a schematic diagram of an import table with a hacker-added address.

In step S210, whether the executable file is a malicious file is determined by the processor 102 according to whether a duplicate content of the import table exists in the executable file. Refer to FIGS. 6A and 6B. FIG. 6A is a schematic diagram of an import table 300 and a PE header 500 in a normal executable file. FIG. 6B is a schematic diagram of an import table 400 with a malicious address added by a hackers. As indicated in FIG. 6A, when a normal program is executed, firstly, a content of the PE header 500 is read, the next content of the import table 300 to read is obtained according to the address to which the index of PE header 500 directs, and the DDL necessary for executing programs is downloaded according to the content of the import table 300. As indicated in FIG. 6B, the attack launched by hackers (PE infection) is described below. Firstly, the content of the import table 300 is duplicated to a padding block such as the block 400A. That is the content of the block 400A is identical to the content of the import table 300. Then, a malicious address is added to the import table 400, for example, the malicious address is added to the block 400B. That is, the content of the block 400B is the newly added malicious address. Then, the content of the PE header 500 is edited, and the index of the PE header 500 is directed to the import table 400. Thus, in the scenario of FIG. 6B, when a program is executed, firstly, the content of the PE header 500 is read, the content of the import table 400 is read according to the index of PE header 500, and the DDL is downloaded according to the content of the import table 400 and the function (including both normal and malicious DDLs and functions) is executed.

Since the hacker cannot add a new malicious address to the import table 300 which is read-only, the hacker, when launching an attack, will duplicate the import table 300 to the padding block and add a malicious address (as indicated in FIG. 6B). Therefore, in step S210, whether the executable file is a malicious file is determined according to whether a duplicate content of the import table 300 exists in a block of the executable file.

If the duplicate content of the import table 300 does not exist in any blocks of the executable file (as indicated in FIG. 6A), then the method proceeds to step S212. In step S212, the executable file is regarded as a normal file by the processor 102, and this indicates that the executable file has not been attacked by the hacker.

If the duplicate content of the import table 300 exists in a block of the executable file, for example, the content of the import table 300 is identical to the content of the block 400A of the import table 400 as indicated in FIG. 6B, which implies that the executable file has been attacked by the hacker, then the method proceeds to step S214. In step S214, the executable file is regarded as a malicious file by the processor 102. In an embodiment as indicated in step S214, after an executable file is regarded as a malicious file, the processor 102 can further locate the malicious DDL and function of the electronic device 100 according to the content of the import table. Refer to FIGS. 5 and 6B. After an executable file is regarded as a malicious file (such as the scenario of FIG. 6B), the processor 102 knows that the content of the block 400B of the import table 400 (corresponding to the content of the name D of the fourth DDL of FIG. 5) is the name of the malicious DDL and the name of the malicious function. Thus, the processor 102 regarded the fourth DDL with name D as a malicious file, and the fourth function with names D1, D2, . . . , DQ as a malicious function.

The judgement for determining whether the executable file is a malicious file according to whether a duplicate content of the import table exists in the executable file as disclosed in step S210 can reach an accuracy of 100%.

As disclosed above, the invention does not detect or scan malicious DDL according to the characteristic value, but determines whether the executable file is a malicious file according to whether a duplicate content of the import table exists in the executable file and locates the malicious DDL according to the distances among the DDLs imported by the executable. Therefore, the invention can effective prevent the PE infection caused by advanced persistent threat (APT) or zero-day malicious programs.

While the invention has been described by way of example and in terms of the preferred embodiment(s), it is to be understood that the present disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting a malicious file, comprising:
searching an executable file and extracting an import table from the executable file, wherein the import table at least comprises a name of a first dynamic-link library (DLL) and a name of a second DLL;
wherein the first DLL comprises a first function which is the last function of the first DLL, and the second DLL comprises a second function which is the first function of the second DLL;
wherein the first DLL corresponds to a first address range that ends with an address of the first function, and the second DLL corresponds to a second address range that starts with an address of the second function;
calculating a distance between the address of the first function and the address of the second function;
determining whether the distance exceeds a threshold; and
regarding the executable file as a normal file if the distance does not exceed the threshold.

2. The method according to claim 1, wherein if the distance exceeds the threshold, then whether a duplicate content of the import table exists in the executable file is checked, and the executable file is regarded as a malicious file if the duplicate content of the import table exists in the executable file.

3. The method according to claim 2, wherein if the duplicate content of the import table does not exist in the executable file, then the executable file is regarded as the normal file.

4. The method according to claim 1, wherein the import table further comprises a plurality of names of a plurality of first functions of the first DLL, a plurality of addresses of the first functions, a plurality of names of a plurality of second functions of the second DLL and a plurality of addresses of the second functions, and the distance is a difference obtained by subtracting the address of the last of the first functions from the address of the first of the second functions.

5. The method according to claim 4, wherein the addresses of the first functions and the addresses of the second functions are relative virtual addresses (RVA).

6. The method according to claim 1, wherein the threshold relates to an average value and a standard deviation of a plurality of distances among a plurality of normal DLLs.

7. The method according to claim 6, wherein the threshold is the average value plus two times of the standard deviation.

8. The method according to claim 1, wherein the threshold is greater than 300 bytes.

9. A method for detecting a malicious file, comprising:
searching an executable file and extracting an import table from the executable file, wherein the import table at least comprises a name of a first DLL and a name of a second DLL;
wherein the first DLL comprises a first function which is the last function of the first DLL, and the second DLL comprises a second function which is the first function of the second DLL;
wherein the first DLL corresponds to a first address range that ends with an address of the first function, and the second DLL corresponds to a second address range that starts with an address of the second function;
calculating a distance between the address of the first function and the address of the second function;
checking whether a duplicate content of the import table exists in the executable file; and
regarding the executable file as a malicious file if both the duplicate content of the import table exists in the executable file and the distance exceeds a threshold.

10. An electronic device, comprising:
a storage unit for storing an executable file; and
a processor for searching the executable file and extracting an import table from the executable file, wherein the import table at least comprises a name of a first DLL and a name of a second DLL;
wherein the first DLL comprises a first function which is the last function of the first DLL, and the second DLL comprises a second function which is the first function of the second DLL;
wherein the first DLL corresponds to a first address range that ends with an address of the first function, and the second DLL corresponds to a second address range that starts with an address of the second function;
wherein the processor calculates a distance between the address of the first function and the address of the second function and determines whether the distance exceeds a threshold; and
the processor regards the executable file as a normal file if the distance does not exceed the threshold.

11. The electronic device according to claim 10, wherein if the distance exceeds the threshold, then the processor checks whether a duplicate content of the import table exists in the executable file, and the processor regards the executable file as a malicious file if the duplicate content of the import table exists in the executable file.

12. The electronic device according to claim 11, wherein if the duplicate content of the import table does not exist in the executable file, then the processor regards the executable file as the normal file.

13. The electronic device according to claim 10, wherein the import table further comprises a plurality of names of a plurality of first functions of the first DLL, a plurality of addresses of the first functions, a plurality of names of a plurality of second functions of the second DLL and a plurality of addresses of the second functions, and the distance is a difference obtained by subtracting the address of the last of the first functions from the address of the first of the second functions.

14. The electronic device according to claim 13, wherein the addresses of the first functions and the addresses of the second functions are relative virtual addresses (RVA).

15. The electronic device according to claim 10, wherein the threshold relates to an average value and a standard deviation of a plurality of distances among a plurality of normal DLLs.

16. The electronic device according to claim 15, wherein the threshold is the average value plus two times of the standard deviation.

17. The electronic device according to claim 10, wherein the threshold is greater than 300 bytes.

* * * * *